June 9, 1953 H. P. LUHN 2,641,714

OPTICAL RECORD READING DEVICE

Filed Oct. 1, 1951 4 Sheets-Sheet 1

INVENTOR
HANS P. LUHN
BY Robert S. Dunham
ATTORNEY

June 9, 1953 H. P. LUHN 2,641,714

OPTICAL RECORD READING DEVICE

Filed Oct. 1, 1951 4 Sheets-Sheet 2

INVENTOR
HANS P. LUHN
BY Robert J. Dunham
ATTORNEY

June 9, 1953 H. P. LUHN 2,641,714

OPTICAL RECORD READING DEVICE

Filed Oct. 1, 1951 4 Sheets-Sheet 3

INVENTOR
HANS P. LUHN
BY Robert S. Dunham
ATTORNEY

INVENTOR
HANS P. LUHN
BY Robert S. Dunham
ATTORNEY

Patented June 9, 1953 2,641,714

UNITED STATES PATENT OFFICE 2,641,714

OPTICAL RECORD READING DEVICE

Hans P. Luhn, Armonk, N. Y., assignor to International Business Machines Corporation, New York, N. Y., a corporation of New York Application October 1, 1951, Serial No. 249,111

6 Claims. (Cl. 250—220)

This invention relates to an optical record reading device. In its more limited aspect the invention relates to means for reading angularly disposed character representing faces of a record device.

Devices for reading records, registers, counters and the like now in common use for the most part require either electrical or mechanical contact with or connection to the indicia representing record member. This requirement of necessity limits the utility of such devices because it becomes thereby difficult, for example, to move such devices with rapidity from one reading position to another.

It is, therefore, an object of the present invention to provide a record reading device that has no physical contact with or connection to the record.

It is a further object of the invention to provide a record reading device which is rendered functional by rays of light reflected from a record number, and one in which such rays may be interpreted as to value by virtue of the relative angularity of their incident of reflection.

The objects of the invention are attained by providing means for presenting each indicia representing surface of a record body at a common reading station in different angular relation to a fixed reference, as for example, a fixed plane passing through the record reading station. At the record reading station is provided a fixed light source from which a beam of light is projected against the indicia representing record surface. The angle of the light reflected from the record surface may then be used as an index of the value it represents. This principle is utilized in one embodiment by directing such reflected rays upon a light sensitive surface which, because of the time in the reading cycle at which it is activated, is representative of the value represented by the record being read, or the position of such ray on such surface may be indicative of its value.

One form of mechanism for achieving the foregoing objects and others inherent in the invention is illustrated in the drawings forming a part of this application. In the drawings like reference numerals indicate like parts, and Figure 1 is an elevational view of the reading device and the mechanism by which it is operated, parts being in section to show underlying structure;

Figure 1:
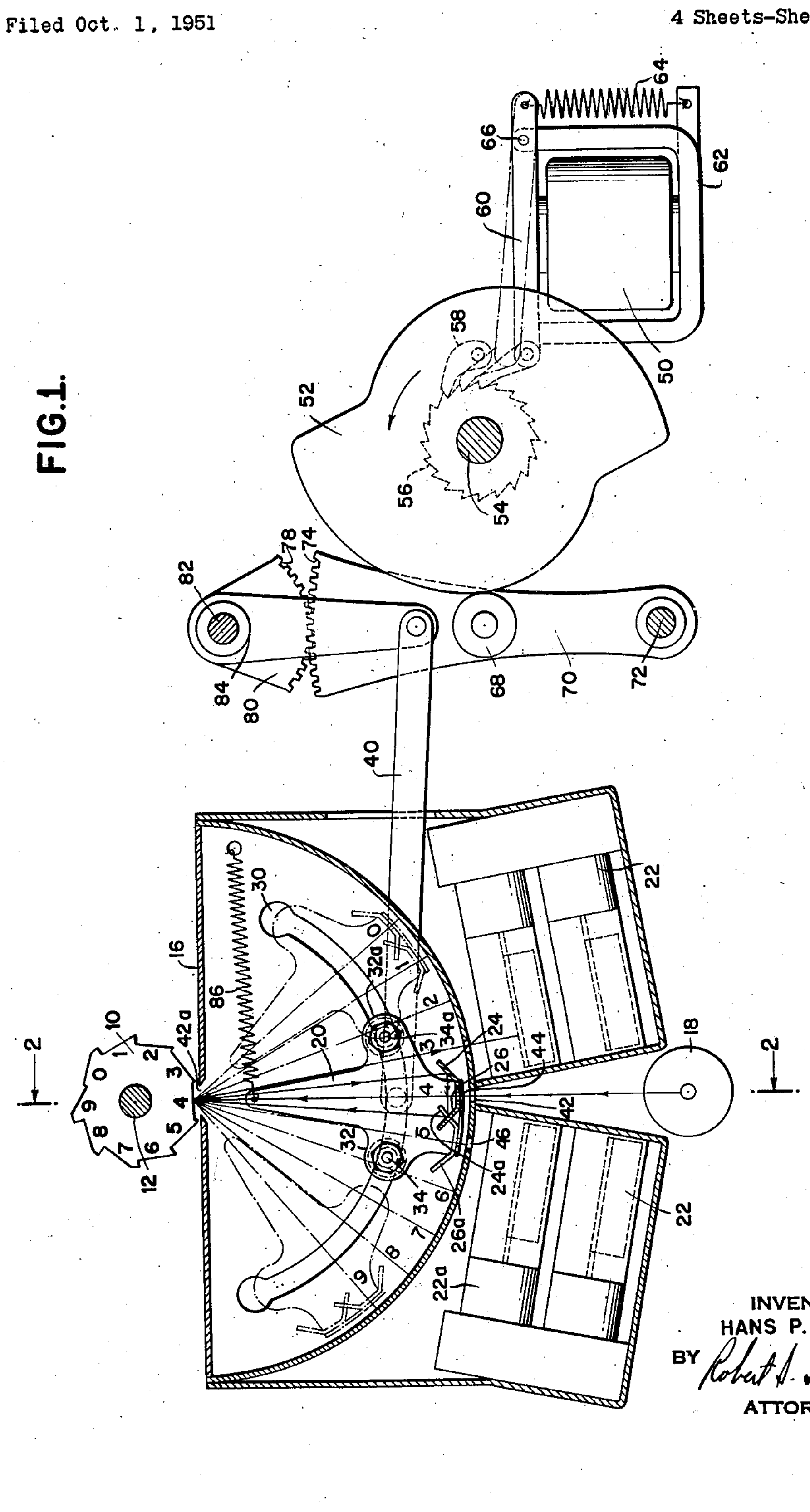

The indicia representing surfaces of a record device to be read may assume a variety of forms, but for the purpose of illustration such indicia representing record is shown in the drawings as a plurality of number wheels 10 mounted for rotation on a shaft 12. By reference to Fig. 1 of the drawings it will be seen that the number wheels 10 have a plurality of peripheral faces 14 which constitute the indicia representing surfaces when the number wheel per se is considered as a record device. Herein the number wheels 10 are provided with ten indicia representing faces 14 representing, by way of example, the digits 0 through 9. By closer examination of the number wheel 10 of Fig. 1 (which is typical) and in particular the indicia representing faces 14 thereon, it will be seen that each of the ten faces is disposed at a different angle. These angles may be considered in regard to a fixed reference such as a fixed plane extending through the reading device such as the cover plate of a reading mechanism 16.

It will be seen that rotation of the number wheels 10 will present the faces thereof successively in different angular relation to a fixed plane such as the cover of the reading device 16. Therefore, when a beam of light from a light source such as a lamp 18 is directed against any one of the faces of the number wheel 10, such beam will be reflected at an angle that is directly related to the angular position of the indicia representing face.

By proper angular disposition of the number wheel, a reflected beam of light therefrom may be caused to fall in a fixed, predetermined plane indicative of the value represented by the number wheel face. This principle is employed by causing the reflected beams to fall upon a light sensitive surface which will record or cause the recording of the represented values. Such light sensitive surface may be one or more photocells, for example. Each number wheel may have associated therewith a photocell for each of its faces so positioned that only the rays from its associated number wheel face will strike it. In such event each photocell would represent a fixed value and a plurality of such photocells associated with a number wheel would be equivalent to a light sensitive film. However, a single photocell may be rendered responsive to the rays reflected from the several number wheel faces by providing in the reading device a beam directing mechanism adapted for progressive movement through all of the reflected beam positions. In this latter event the differential time at which the single photocell is energized will be representative of the value being read from the number wheel surface. This latter concept has been chosen for specific illustration herein.

The reading device has a beam pick-up bail 20 which is designed for movement in a path that will intersect all of the beams reflected from the number wheel faces. The bail 20 has mounted thereon reflecting surfaces by means of which a beam of light reflected from the number wheel 10 is picked up and directed so that such beams eventually strike the proper one of a plurality of the photocells 22 provided in the device. As heretofore intimated, the photocells 22 are in a control circuit so that when a photocell is energized it will control a recording operation such as the actuation of a punch in a statistical card reproducing punch as to be more particularly pointed out hereinafter in regard to Fig. 5 of the drawings.

Figure 2:
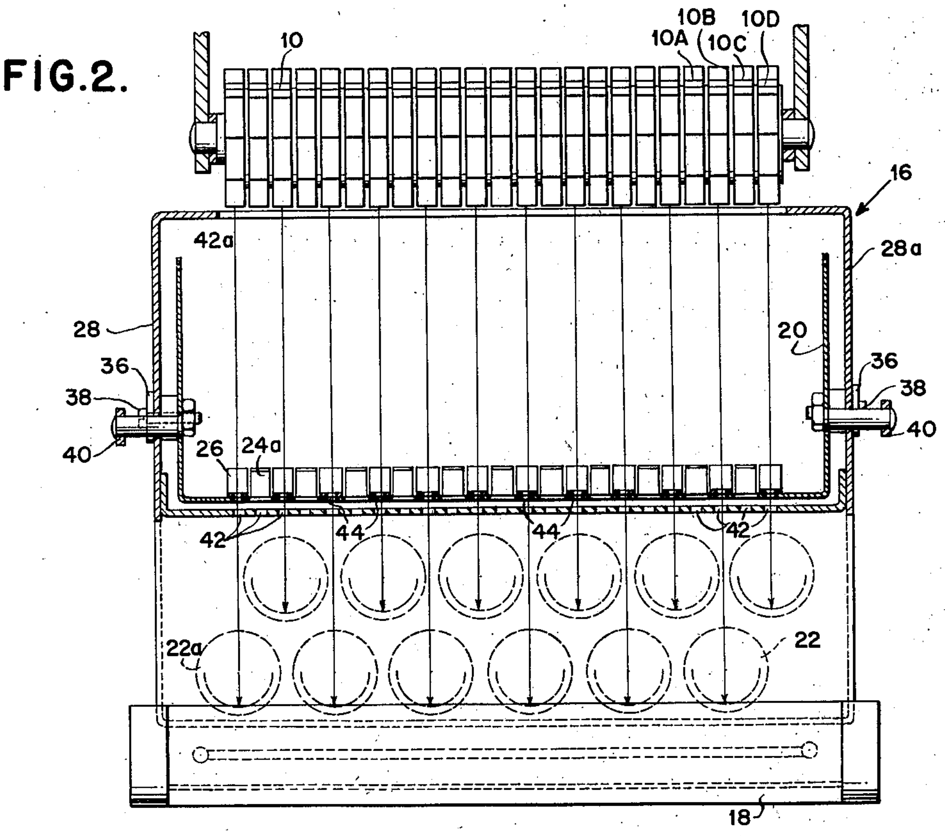
Fig. 2 is a cross-sectional view on line 2—2 of Fig. 1.

Fig. 2 of the drawings shows a plurality of counter wheels 10 constituting a bank representing the orders of a single number or perhaps the orders of a plurality of numbers. The number wheel 10*a* may represent thousands, the number wheel 10*b* may represent hundreds, the number wheel 10*c* may represent tens and the number wheel 10*d* may represent units. Thus it may be seen that numerical values may be represented in the number wheel bank shown herein. Each of the wheels of a bank will be identical insofar as position and attitude of the respective indicia representing faces are concerned.

The beam pick-up bail 20 constitutes a generally U-shaped member wherein the bight of the U carries a series of reflecting mirrors 24 and 26, constituting a set, and a second series 24*a* and 26*a*, constituting a second set. One pair of such reflecting mirrors is provided for each of the number wheels in a bank. The bail 20 is mounted for movement in a fixed path. By reference to Fig. 1 of the drawings it will be seen that the side walls 28 and 28*a* of the reader casing have formed therein arcuate slots 30. These slots are of identical shape and in exact registration with each other. The bail 20, and in particular the upstanding legs thereof, each has a pair of ears 32 and 32*a* extending laterally therefrom for the reception of guide studs 34 and 34*a*. The guide studs 34 and 34*a* extend outwardly through the arcuate slots 30 to constitute bearings on which the bail 20 is guided from one end of the slots to the other. Each set of guide studs 34 and 34*a* is connected at the outside of the casing by means of a plate 36 from the mid-point of which extends a stud 38. Bail actuating levers 40 are mounted on the studs 38.

A photo-electric cell 22 is provided for each of the number wheels 10 in the number wheel bank. When the number wheels 10 are spaced close to each other and are numerous as in the example given, it becomes necessary to arrange the photocells 20 in such way that a beam of light projected from a number wheel will fall upon its photocell without interference from adjacent photocells. Accordingly, the photocells may be arranged in two banks wherein the photocells of each bank are staggered in respect to each other. In Fig. 1 of the drawings it may be assumed that the photocell banks at the left of the figure are those corresponding to the odd numbered wheels, whereas those at the right of the figure correspond to the even numbered wheels.

Figure 3:
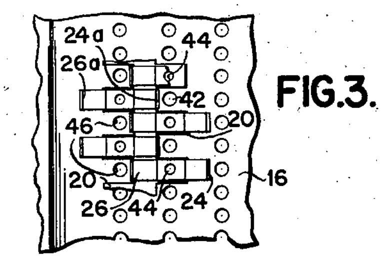
Fig. 3 is a fragmentary plan view of a reflected member constituting an element of the invention.

This necessary arrangement of the photocells under such circumstances dictates that the light reflecting mirrors 24, 26, 24*a* and 26*a* be disposed on the beam pick-up bail 20 in a particular fashion, so that the light rays will be properly directed. It may be appropriate at this point to describe in greater detail the disposition of the light reflecting surfaces on the bail 20. By reference to Fig. 1 it will be seen that the bight of the bail 20 supports thereon the mirror sets 24—26 and 24*a*—26*a* in staggered relation, i. e. in lateral offset relation with respect to each other along the length of the bail. This arrangement is best shown in Fig. 3 of the drawings. The mirror combinations 24 and 26 reflect light rays from the odd numbered counter wheel in such manner that these rays are finally directed onto the related photo-electric cells at the left of that figure, whereas the mirror combinations 24*a* and 26*a* reflect light rays from the even numbered counter wheels in such manner that these rays are finally directed onto the related photo-electric cells at the right of Fig. 1.

The common light source 18 is in the form of an elongated lamp 18 disposed between the photocell banks. The rays of the lamp 18 are projected through a slot or a series of holes 42 in the bottom of the casing 16. These light rays will fall on the indicia representing surfaces of the number wheels 10 that are presented at a reading station 42*a* in the reader housing 16. Since the bail 20 during its movement intersects the line between the lamp 18 and the reading station 42*a*, there has been provided herein an aperture 44 between each of the mirrors of the mirrors 24 and 26 of a pair to permit free passage of light from the lamp 18 to the face of the counter wheel at the reading station 42*a* at such times when the bail is in the path of the beam.

Assuming the parts of the reading device to be in the position shown in Fig. 1, which is the position for reading a character representing surface of the record indicative of the digit 4, under such conditions a ray of light originating in the lamp 18 will pass upwardly through the aperture 42 in the casing 16, through the aperture 44 of the bail 20 and fall upon the surface of the counter wheel 10 that is representative of the digit 4. The angle of the counter wheel surface representative of the digit 4 is such that the light ray will be reflected therefrom against the mirror 26 and from thence against the mirror 24, this latter mirror being arranged at such angle to reflect the beam upwardly once more against the surface of the number wheel representative of the character 4 so that the incident of the reflection from the counter wheel surface will carry the beam downwardly beyond the edge of the mirror 26 and through an aperture 46 in the casing 16 where the photo-electric cell 22*a* will be activated.

Figure 4:
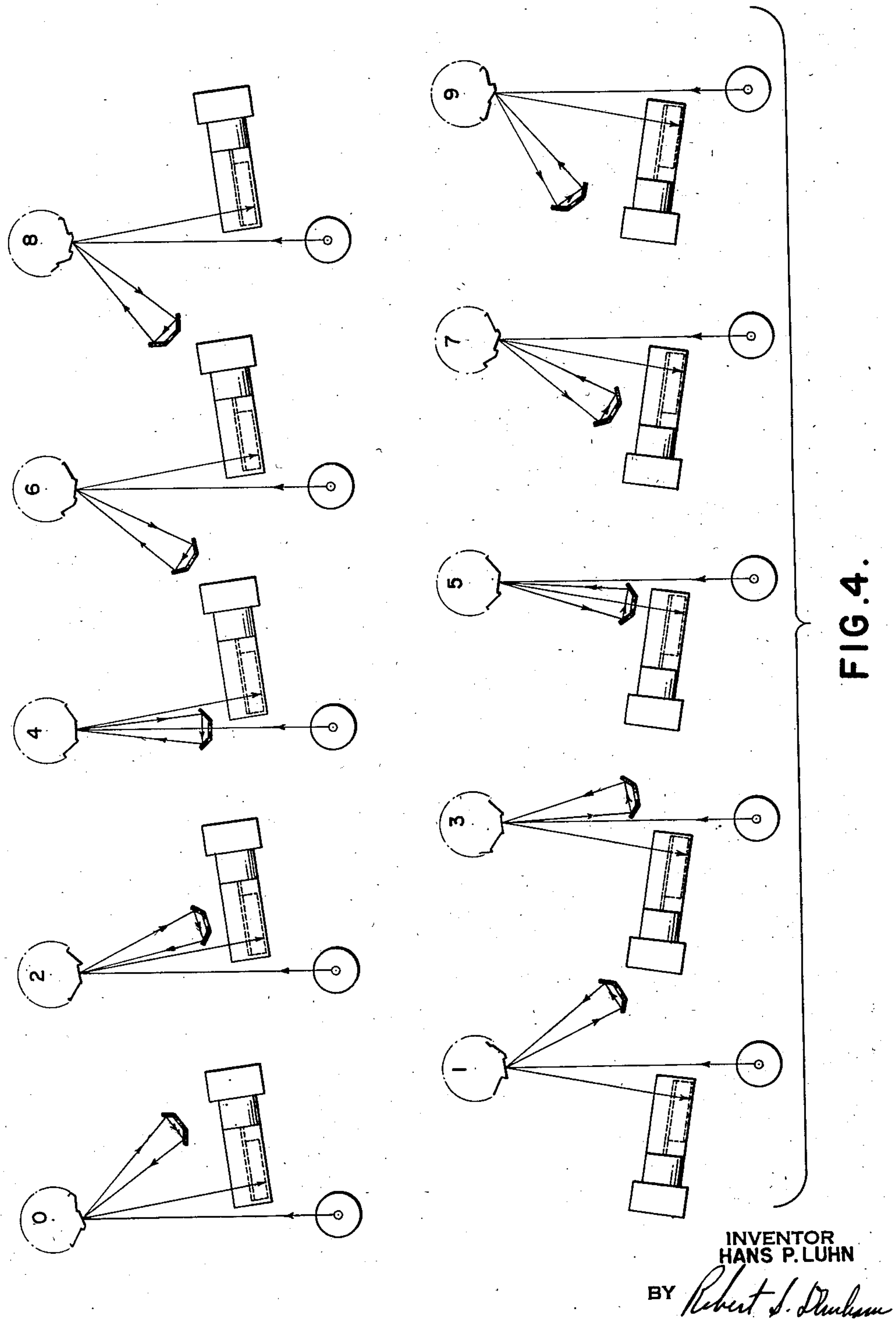
Fig. 4 is a diagrammatic view that shows ten different reading positions of indicia surfaces representative of digits 0 through 9.

With this in mind, attention is directed to Fig. 4 of the drawings wherein the reading position of the beam pick-up bail 20 is diagrammatically illustrated for each of the digit representing surfaces 0 through 9. From consideration of Fig. 4 of the drawings it will appear that the reflecting face of each of the digit representing facets of the number wheel reflects the light ray in a slightly different path, but that the re-reflected ray from the counter wheel faces onto the photocell for each position is the same. From what has gone before it can be appreciated that if the bail 20 is stepped from one position to another in fixed time sequence, each ray reflected from the counter wheel facets can be made to represent a definite and different digital value.

Means has been provided for moving the bail 20 through the reflected rays in step-by-step progression. Herein that means is shown as being an electro-magnet 50 which is synchronously energized with, for example, the passage of a statistical record card through a card punch. The mechanism for imparting the motion to the bail 20 may be varied, but is shown herein as a simple pawl and ratchet driven cam mechanism. A cam 52 is mounted for rotation on a shaft 54. Fixed to the cam 52 is a ratchet wheel 56 adapted to cooperate with a pawl 58 carried at the free end of an electro-magnet armature 60 which is mounted for rocking movement in a magnet frame 62. The armature is normally forced upwardly by tension of a spring 64 which connects one end thereof with a fixed frame member, thereby tending to rock the armature in a clockwise direction about a pivot shaft 66. Thus, when the magnet 50 is energized, its armature 60 will be attracted thereby conditioning the pawl 58 to advance the ratchet wheel 56 and its attached cam 52 one position upon deenergization of the magnet. Upon deenergization of the magnet 50, the spring 64 will rock the armature 60 in a clockwise direction about its pivot shaft 66 and thereby rotate the ratchet wheel 56 and the attached cam 52 the space of one tooth.

The cam 52 rides in contact with a cam follower 68 extending laterally from a point substantially midway in the length of a segment 70 mounted for rocking movement about a segment shaft 72. The free end of the segment 70 has teeth 74 thereon which engage teeth 78 in a segment 80 which is mounted for rocking movement on a segment shaft 82. Attached to the segment shaft 82 are levers 84 through which motion is transmitted to the bail operating links 40.

The drive mechanism just described is sufficient to step the beam pick-up bail 20 through the successive positions representative of the digits 0 through 9. After the 9 position has been passed, the cam follower 68 drops into the low part of the cam 52 which permits the bail 20 to reset into the 0 position under the influence of a bail return spring 86.

Figure 5:
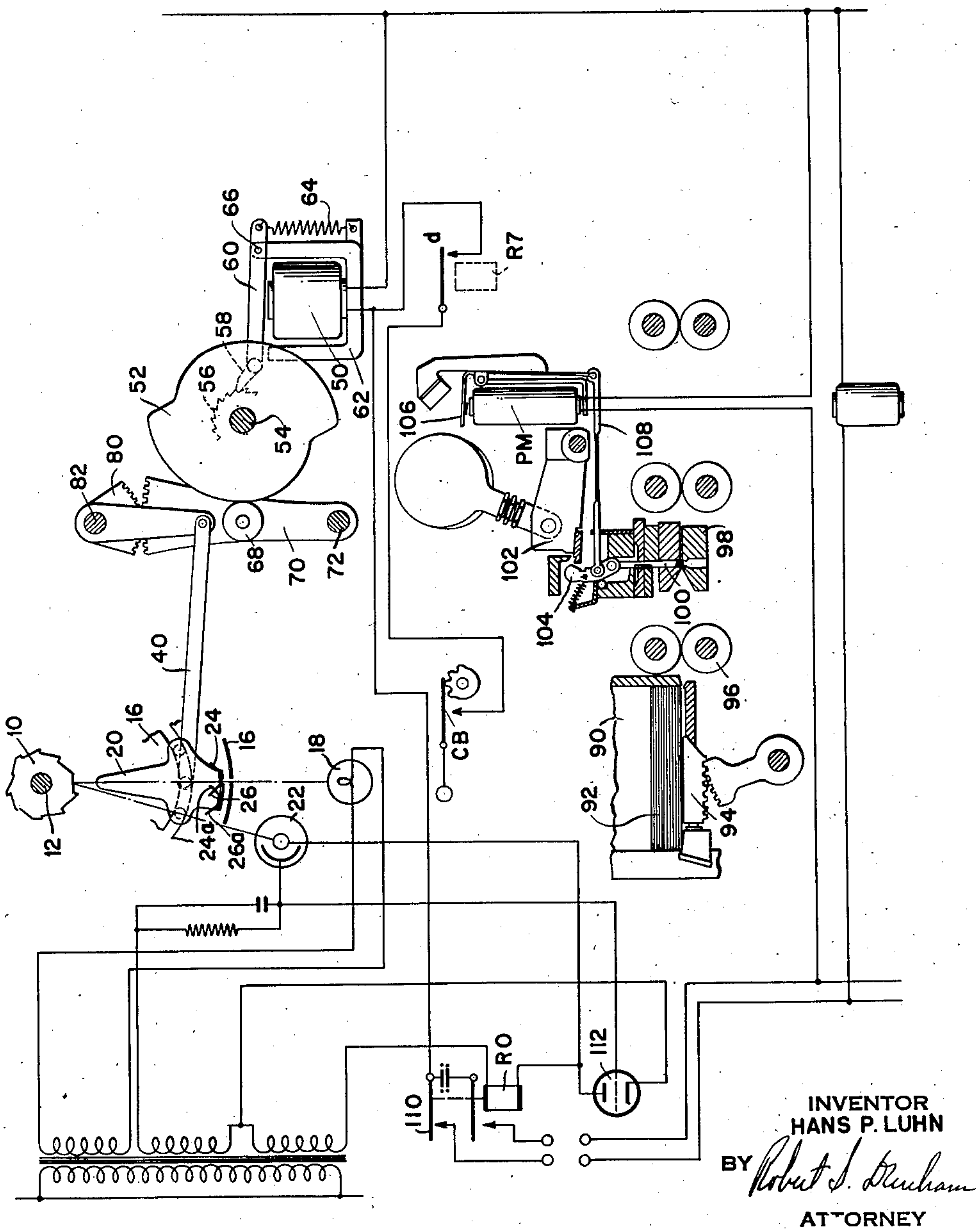
Fig. 5 is a schematic view of the reading device in conjunction with a circuit controlled thereby for operating a statistical card punch.

As intimated hereinabove, the photo-electric counter may find many uses, as for example in the production of punched statistical cards in a card punch such as shown in the Clair D. Lake Patent No. 2,032,805. Certain elements of the card punch of that patent are shown in Fig. 5 of the drawings to aid in orientation of the parts. A reproducing punch such as that shown in the above mentioned patent includes a card magazine 90 adapted to receive a stack of blank statistical cards 92 into which it is desired to punch certain data. A card picker 94 is reciprocated at the bottom of the card stack to separate therefrom one card at a time and advance such separated card into a pair of feed rollers 96. Associated with the card magazine is a card lever contact as shown in the above mentioned Lake patent. The feed rollers 96 advance the blank record cards into a punch block 98 through which operates a series of aligned punch elements 100. The punches 100 are actuated by punch actuating mechanism 102 which becomes operative when an interposer 104 is positioned between the punch actuating mechanism 102 and its related punch 100. Such interposed relation of the interposer 104 is effected when a punch magnet PM is energized to attract its armature 106. The armature is connected to an interposer operating linkage 108 through which the interposer 104 is rocked into the path of the punch actuating mechanism 102 each time the magnet PM is energized.

After card feeding from the magazine 90 has started and the punch brush card lever contact as in the Lake patent is closed, relay R7 will be energized. The relay R7BU points, as in the aforesaid Lake patent, will close, thereby preparing circuits to the bail operating magnet 50 and to the common side of read-out contacts 110.

As a second card feeding cycle is started, the bail 20 is at the 0 position, and all counters of the bank will direct their light beams to their corresponding photocells. The photocells will conduct and cause a change of voltage in the grid of a power amplifier 112, which will then conduct and energize a read-out relay RO which is connected in the plate circuit of the power amplifier 112. The points of the read-out relay RO will close to prepare a circuit to the selected punch magnets PM.

At 0 time of the cycle index a timed, cam operated contact CB will complete the circuits to the reflector magnet 50 through the transferred read-out points of the read-out relay RO and to the corresponding punch magnets PM. Energization of the reflector bail magnet 50 will advance the pawl 58 one tooth position on the ratchet wheel 56 as hereinabove described.

At 0.3 time on the cycle index the circuit will be broken by the CB cam contact and the magnets will be deenergized. Thereupon, the spring 64 will cause the armature 60 to rock in a clockwise direction about its pivot shaft 66 to advance the ratchet wheel 56 and its attached cam 52 to the next reading position. All counters at the 1 position will now be read and their associated read-out relays energized in the same manner as described in respect to the 0 position. At 1 time on the index the CB cam will again complete circuits to the reflector bail magnet 50 and to the punch magnets PM, and any positions in which number wheels showing the surface representative of 1 at the reading station 42 will be punched. In similar fashion the bail 20 will be moved through the remaining eight numeric positions. When the 9 pulse ends, which is approximately at 9.3 of the cycle index, the reflector magnet 50 will be deenergized and the reflector drive cam 52 will move to its lowest position, thus permitting the cam follower 68 to drop and the reflector bail 20 to return to 0 position under influence of the spring 86.

The principle of the invention has been set forth to permit its application to a variety of physical embodiments and one concrete embodiment has been described by way of example. Having thus described the invention, the scope of the same will be defined in the following claims.

I claim:

1. Means for reading a plurality of indicia representing surfaces of a record device comprising, a common reading station, means for presenting each indicia representing surface of a record device at said common reading station in a different angular relation to a fixed plane passing through said common reading station, means for projecting a beam of light against an indicia representing surface presented at said reading station, a light sensitive device, a light reflecting member mounted for movement through a plurality of positions corresponding to the different angular positions of presentation of indicia representing surfaces at said reading station, light reflecting surfaces on said member adapted to direct a ray of light reflected from a differently disposed indicia representing surface to said light sensitive device in each of its positions of movement, and means for moving said light reflecting member through its several positions.

2. Means for reading a plurality of indicia representing surfaces of a record device comprising, a common reading station, means for presenting each indicia representing surface of a record device at said common reading station in different angular relation to a fixed plane passing through said common reading station, means for projecting a beam of light against an indicia representing surface presented at said reading station, a light sensitive device, a light reflecting member mounted between said indicia representing surface presenting means and said light source for movement through a plurality of positions corresponding to the different angular positions of presentation of indicia representing surfaces at said reading station, angularly related light reflecting surfaces on said member adapted to direct a ray of light reflected from a differently disposed indicia representing surface to said light sensitive device in each of its positions of movement, and electro-magnetic means for moving said light reflecting member through its several positions.

3. Means for reading a plurality of indicia representing surfaces of a plurality of record devices comprising, a common reading station, means for presenting each indicia representing surface of a plurality of record devices at said common reading station in different angular relation to a fixed plane passing through said common reading station, a common light source for projecting a beam of light against the indicia representing surfaces presented at said reading station, a light sensitive device for each of said record devices, a light reflecting member mounted for movement through a plurality of positions corresponding to the different angular positions of presentation of indicia representing surfaces at said reading station, separate pairs of angularly related reflecting surfaces for each of said record devices on said member adapted to direct a ray of light reflected from any one of the differently disposed indicia representing surfaces of a related record device to its light sensitive device in each of its positions of movement, and means for moving said light reflecting member through its several positions.

4. In means for reading a plurality of indicia representing surfaces of a record device, a common reading station, a rotatable number wheel mounted at said common reading station, a plurality of faces in the periphery of said number wheel representative of the digits 0 through 9 each in different angular relation to a fixed plane passing through said common reading station, means for projecting a beam of light against a digit representing face presented at said reading station, a light sensitive device, a light reflecting member mounted for movement through a plurality of positions representative of the digits 0 through 9, light reflecting surfaces on said member adapted to direct a ray of light reflected from a different digit representing face of said wheel to said light sensitive device in each of its positions of movement, and means for moving said light reflecting member through its several positions.

5. In means for reading a plurality of indicia representing surfaces of a record device, a common reading station, a rotatable number wheel mounted at said common reading station, a plurality of faces in the periphery of said number wheel representative of the digits 0 through 9 each in different angular relation to a fixed plane passing through said common reading station, means for projecting a beam of light against a digit representing face presented at said reading station, a light sensitive device, a light reflecting member mounted between said number wheel and said light source for movement through a plurality of positions representative of the digits 0 through 9, angularly related reflecting surfaces on said member adapted to direct a ray of light reflected from a different digit representing face of said wheel to said light sensitive device in each of its positions of movement, and electromagnetic means for moving said light reflecting member through its several positions.

6. In means for reading a plurality of indicia representing surfaces of a plurality of record devices, a common reading station, a plurality of rotatable number wheels mounted at said common reading station, a plurality of faces in the periphery of each of said number wheels representative of the digits 0 through 9 each in different angular relation to a fixed plane passing through said common reading station, common means for projecting a beam of light against the digit representing faces presented at said reading station, a light sensitive device for each of said number wheels, a light reflecting member mounted between said number wheel and said light source for movement through a plurality of positions representative of the digits 0 through 9, separate pairs of angularly related reflecting surfaces for each of said record devices on said member adapted to direct a ray of light reflected from any one of the different digit representing faces of a related number wheel to its light sensitive device in each of its positions of movement, and means for moving said light reflecting member through its several positions.

HANS P. LUHN.

References Cited in the file of this patent

UNITED STATES PATENTS

| Number | Name | Date |
|---|---|---|
| 1,854,838 | Hartsough | Apr. 19, 1932 |
| 2,182,000 | Nichols | Dec. 5, 1939 |
| 2,218,464 | Fairchild | Oct. 15, 1940 |
| 2,449,953 | Rippingille | Sept. 21, 1948 |
| 2,558,721 | Allen et al. | July 3, 1951 |